United States Patent [19]

Embree

[11] 4,237,862
[45] Dec. 9, 1980

[54] CLOSED PRESSURIZED SOLAR HEATING SYSTEM WITH AUTOMATIC SOLAR COLLECTOR DRAIN-DOWN

[75] Inventor: John M. Embree, Charlottesville, Va.

[73] Assignee: Helios Corporation, Charlottesville, Va.

[21] Appl. No.: 890,306

[22] Filed: Mar. 27, 1978

[51] Int. Cl.$^3$ .............................................. F24J 3/02
[52] U.S. Cl. .................................. 126/420; 126/435
[58] Field of Search ........ 126/400, 420, 432, 435–437, 126/450, 446, 417; 137/59–62

[56] References Cited

U.S. PATENT DOCUMENTS

| | | | |
|---|---|---|---|
| 2,342,211 | 2/1944 | Newton | 126/436 |
| 3,152,442 | 10/1964 | Rowekamp | 126/435 |
| 3,894,528 | 7/1975 | Stubblefield | 126/433 |
| 4,027,821 | 6/1977 | Hayes et al. | 126/420 |
| 4,138,996 | 2/1979 | Cartland | 126/420 |

OTHER PUBLICATIONS

"Solar Heating Systems Design Manual", Bulletin Tese—576, Copyright 1976, pp. 4-8 through 4-15, ITT, Training and Education Department, Fluid Handling Division.

Primary Examiner—James C. Yeung
Attorney, Agent, or Firm—Oblon, Fisher, Spivak, McClelland & Maier

[57] ABSTRACT

A closed pressurized solar heating system in which a solar collector is automatically drained of heat transport fluid independently of valve actuation or valve position. Undersized pipe return lines connect the solar collector to top, bottom and intermediate openings of a sump tank which is initially filled with the fluid, water, to a level between the top and intermediate openings. Drain-down automatically commences upon de-energization of a system pump, whereupon air from the top of the sump tank enters the pipe return line, breaking the vacuum existing within the flow path, and initiating fluid return to the sump tank. High flow rate embodiments with similarly automatic drain-down features are also disclosed. These embodiments employ flow diversion devices to divert fluid flow to undersized pipe return lines in communication with the sump tank during initial filling of the solar collector. After a predetermined time delay, fluid flow in the pipe return line is returned to oversized pipe sections which essentially bypass the sump tank and permit high flow rates.

7 Claims, 5 Drawing Figures

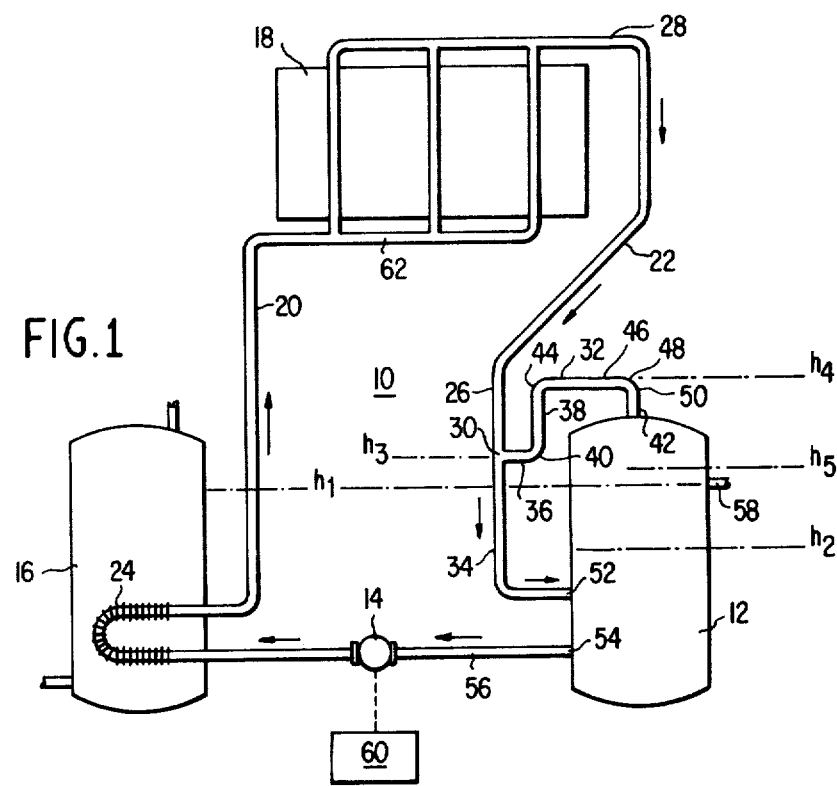
FIG.1
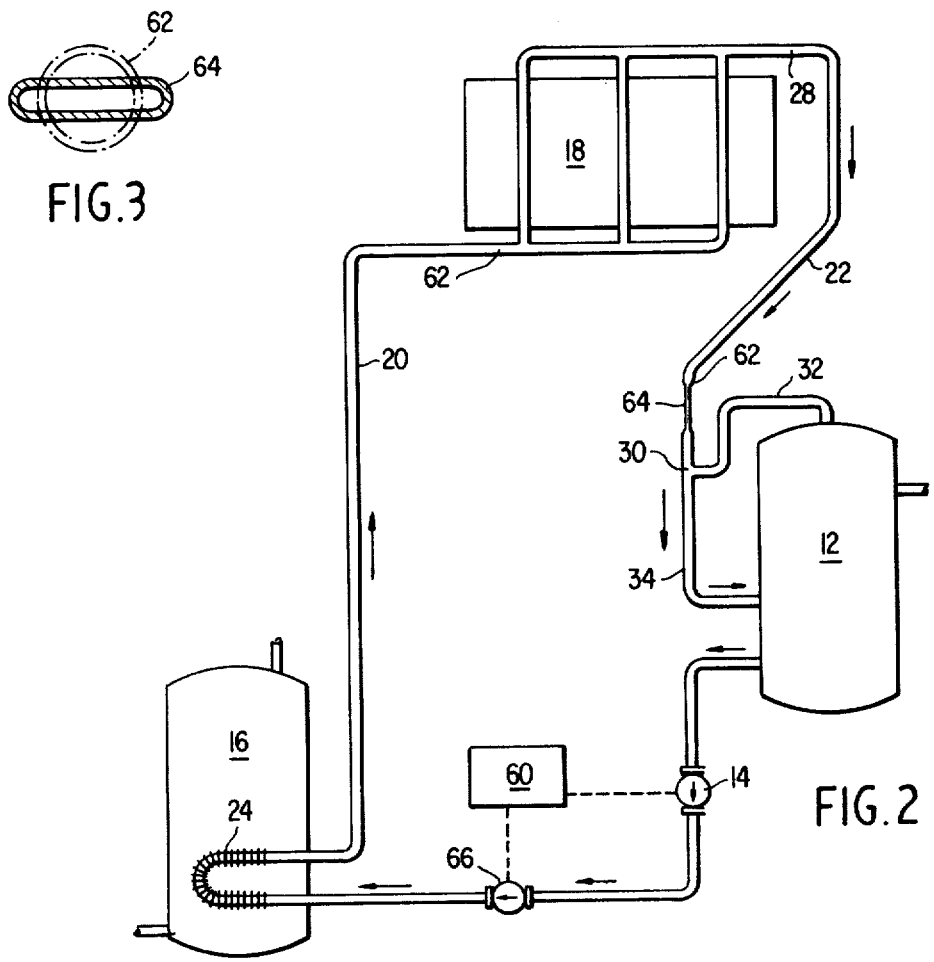
FIG.3
FIG.2

CLOSED PRESSURIZED SOLAR HEATING SYSTEM WITH AUTOMATIC SOLAR COLLECTOR DRAIN-DOWN

BACKGROUND OF THE INVENTION

1. Field of the Invention

This invention relates to solar heating systems, and more particularly to closed solar heating systems operating at various flow rates and which are provided with means to drain a solar collector during periods of cold temperature automatically and independently of valve actuation or position.

2. Description of the Prior Art

A perennial problem associated with solar heating systems involves the need to protect the solar collectors exposed to the environmental elements from the effects of cold temperatures. In particular, solar collectors are generally susceptible to breakage during periods of extreme cold when a fluid circulating through the collectors is likely to freeze within the collector unless preventative measures are taken.

One preventative measure suggested in the prior art is to add antifreeze to the collector circulating fluid in order to lower the freezing point of this fluid. Antifreeze, however, is not only expensive, but also poisonous and therefore represent a serious potential safety hazard. Furthermore, although an anti-freeze mixture does not freeze at lower temperatures, nevertheless the temperature of the mixture does drop to the low ambient temperature. Therefore substantial time is needed to heat the cold anti-freeze mixture to a useable temperature as the solar environment of the collector improves.

It has therefore been desirable to protect solar collectors from fluid freezing by draining the collectors during periods of cold temperature. One such system, as disclosed in U.S. Pat. No. 4,044,754 to Cronin et al., employs drainage valves in piping below the level of the solar collector to drain the collector during periods of low temperature. Also provided at the highest point of the system is a vacuum-braker valve which allows air to enter the water lines to facilitate drainage.

Another solar collector drainage system is disclosed in U.S. Pat. No. 4,027,821 to Hayes et al. wherein a vent line connects the top of the collector to a storage tank and provides an air passageway to the collector from the storage tank to enable drainage of the collector. The vent line is connected to the collector by means of a check-valve and a solenoid actuated valve to initiate drainage of the collector and the vent line.

While the system of the prior art generally provide effective drainage during normal operation, it is seen that they employ mechanically operated valves to initiate drainage. Unfortunately, valves of this type are prone to failure, especially at low temperature when their function is vital to protect the system. In that regard, it is noted that the flow passages of valves tend to be small and are likely to freeze due to condensation or minor back-dripping in the system, and valves are therefore believed to be inherently unreliable drainage components.

It is further noted that "open" drainage systems which utilize valving actuation to admit exterior air into the system during drainage, cannot be easily pressurized due to valve leakage, and are therefore to some extent susceptible to boiling and vaporization at operating temperatures in excess of 212° F. Since vaporization is most likely to occur at the output of the solar collector, a hydraulic imbalance is created between the supply and the return lines to the collector, thereby increasing the load to the system pump. Furthermore, the "open" system introduces fresh oxygen into the system during each system drainage, which contributes to steady corrosion of the flow passages within the system.

SUMMARY OF THE INVENTION

Accordingly, one object of this invention is to provide a novel solar heating system with reliable collector drainage during periods of cold temperature.

Another object of this invention is to provide a novel solar heating system which utilizes water as a circulating fluid.

A further object of this invention is to provide a novel valveless solar collector drainage system for a solar heating system.

Yet another object of this invention is to provide a solar heating system capable of operation at elevated temperatures.

A further object of this invention is to provide a novel closed and pressurized solar heating system.

Another object of this invention is to provide a novel closed and pressurized solar heating system with improved solar collector drain-down.

Yet another object of this invention is to provide a novel solar heating system with reliable solar collector drain-down at high system flow rates.

A further object of this invention is to provide novel means for filling any elevated drainable device through which liquid flow is desired in a closed system.

These and other objects of the present invention are achieved by providing a closed pressurized solar heating system having a sump tank serving as a fluid reservoir, and a fluid circulating pump which circulates a heat transport fluid from the sump tank through the pump to a heat exchange tank. The heat transport fluid, after passing through the heat exchange tank is returned to the collector through collector supply lines, where it is re-heated and returned to the pump via collector return lines. The return lines also communicate with the sump tank to promote valveless drain-down of the solar collector whenever pump operation ceases.

During operation, the sump tank is initially filled to a level generally midway between an opening at the top of this tank and another opening intermediate between the top and bottom of the tank, the system pump being connected to an opening in the bottom of the sump tank. The collector return line is provided with a "T" junction in the vicinity of the sump tank, wherefrom a vacuum-break section is connected to the top opening of the sump tank and an initial draining section is connected to the sump tank intermediate opening. When pump operation ceases, fluid in the initial draining section continues flow under the force of gravity into the sump tank, thereby drawing air from the top opening of the sump tank into the return line through the vacuum break section. When air reaches the "T" junction, the vacuum in the return line is broken and drain-down of the collector commences.

Specific embodiments include solar heating systems employing varying flow rates, but each exhibiting collector drain-down independent of valve actuation or valve position. The low-flow systems generally employ differently sized return and supply lines to facilitate start-up. On the other hand, the high flow-systems utilize flow diversion techniques to initiate start-up, while nevertheless utilizing the basic drain-down concept of the invention.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 is a schematic system diagram of a closed pressurized solar heating system utilizing valveless collector drain-down according to the present invention;

FIG. 2 is a schematic system diagram of another embodiment of the invention shown in FIG. 1;

FIG. 3 is a view of the cross-section of a restriction in the return line piping of the embodiment shown in FIG. 2;

DETAILED DESCRIPTION OF THE PREFERRED EMBODIMENTS

Figure 4:
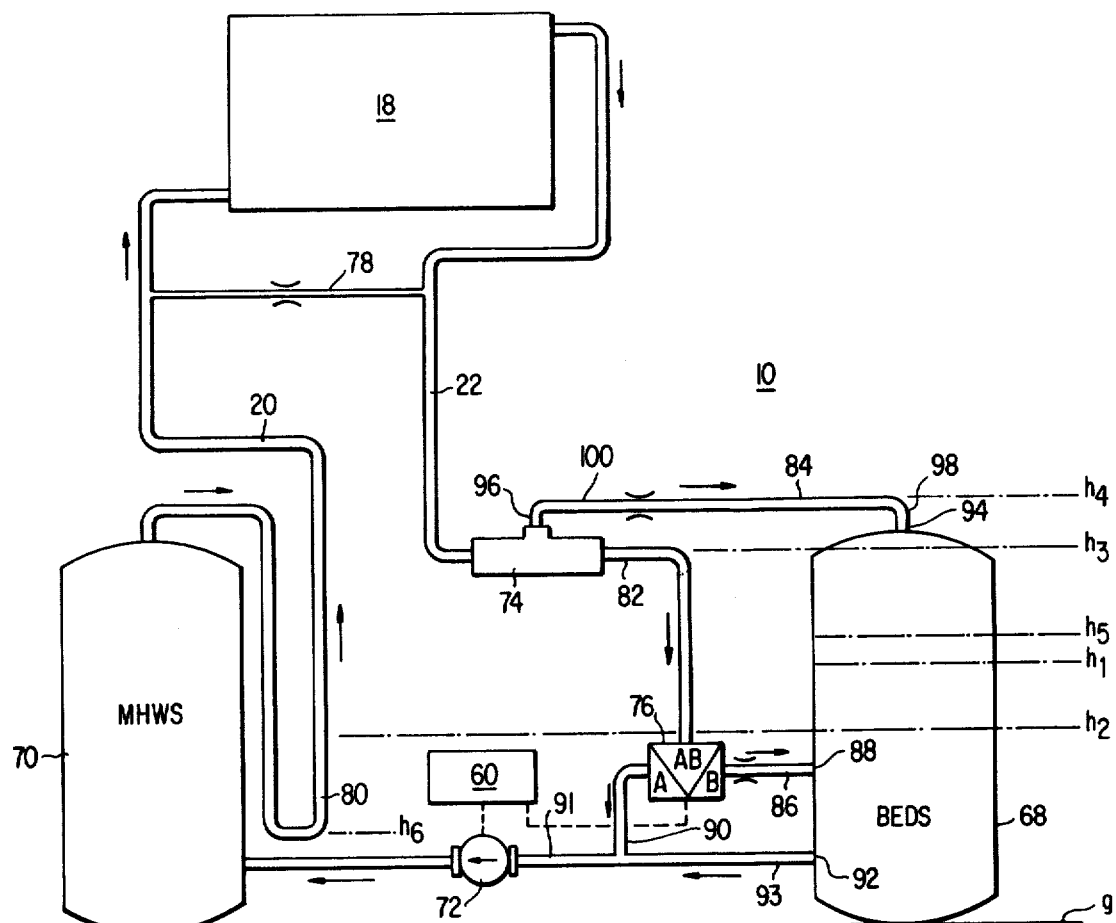
FIG. 4 is a schematic system diagram of a high flow solar heating system incorporating the basic collector drain-down technique according to the present invention.

Referring now to the drawings, wherein like reference numerals designate identical or corresponding parts throughout the several views, and more particularly to FIG. 1 thereof, the solar heating system 10 is generally seen to include a sump tank 12, a system pump 14, a heat exchange tank 16, and a solar collector 18. The pump 14 is connected to the collector 18 through the collector supply line 20, and the collector is likewise connected to the sump tank 12 by means of the collector return line 22. The supply line 20 includes a heat exchange section, generally labeled as 24, within the heat exchange tank 16, which is provided with external fins in order to transfer heat from the circulating heat transport fluid, i.e. water, to the fluid inside the heat exchange tank 16. Thus the heat exchange tank 16 serves to store heat collected at the solar heating collector.

The solar collector 18 may include a single energy collecting unit, or a plurality of such units connected in series and parallel fluid combination. However, each collector unit forming the collector 18 includes a plurality of vertically disposed fluid circulation tubes connected by means of collector headers (not shown). Therefore, flow through the collector 18 is generally in a vertical direction, and any horizontal collector header piping is provided with a slight backslope to assure complete drain-down of the collector 18.

As seen in FIG. 1, the collector return line 22 consists of several interconnected piping sections. A first section 26 extends from the output 28 of the solar collector 18 to a junction 30 in the return line 22. The junction 30 is a "T" coupling whereby the first section 26 of the return line 22 branches at a right angle to the return line into a vacuum-break section 32, and a vertical initial draining section 34. The vacuum-break section 32 includes a horizontal section 36 and a vertical anti-siphoning section 38 connected to the horizontal section 36 at the right angle bend 40. The vacuum-break section 32 is then connected to the top 42 of the sump tank 12 by means of a second right angle bend 44, a second generally horizontal section 46, a third right angle bend 48, and the short vertical section 50 into the top 42 of the sump tank 12.

The return line 22 continues vertical descent from the collector 18 through the junction 30 and the initial draining section 34 into an intermediate opening 52 in the sump tank 12. The sump tank 12 is further provided with a bottom outlet 54 below the intermediate opening 52. The outlet 54 communicates with the input of the system pump 14 by means of the horizontal section 56 of the supply line 20.

The embodiment shown in FIG. 1 is generally intended for low flow rates of from 2–5 gallons per minute and therefore it is possible to effectively employ different sized piping in the supply line 20 and the return line 22, without unduly overloading the hydraulic load to the pump 14, to facilitate fill up of the collector 18 during start-up of the system. Thus, the supply line 20 for the system shown in FIG. 1 is formed of ¾ inch internal diameter piping, while the return line 22 for the most part uses piping having a ½ inch internal diameter.

As shown in FIG. 1, the solar heating system 10 is initially filled to the level $h_1$ with water through the flow plug 58 in the side of the sump tank 12. Thus, all the system piping above the level $h_1$ is initially filled with air, and the system below $h_1$ is filled with water. The operating level $h_2$ of the system 10 is indicated at $h_2$, while the levels of the junction 30, and the top of the section 38 of the vacuum-break section 32 are respectively indicated as $h_3$ and $h_4$. The level $h_5$ refers to the drain-down level within the sump tank 12 of a heated thermally expanded transport fluid. The levels $h_1$–$h_5$ are referenced against the ground plane.

Also, shown schematically in FIG. 1 are the sump tank fill plug 58, and the electronic controller 60. The controller 60 senses a temperature differential between the solar collector 18 and the heat exchange tank 16. When this temperature differential exceeds a preset minimum of about 7° C., the controller 60 supplies electric power to the system pump 14 which draws water from the sump tank 12 and pumps this water through the collector supply line 20 and up to the top of the collectors 18 where the water is heated as a result of impinging solar energy. From the collector 18, the heated water is pumped through the return line 22, past the junction 30, through the vertical initial-draining section 34, and back into the sump tank 12 through the opening 52. As the supply line 20, the solar collector 18, and the return line 22 fill with water, air is dumped into the sump tank 12, lowering the water level in the sump tank 12 from the level $h_1$ to the operating level $h_2$. Since the level $h_2$ is above the return line opening 52 into the sump tank 12, quiet operation is assured. It is noted that the height differential $h_4$–$h_3$, i.e. from the top of the anti-siphon section 38 of the vacuum brake section 32 to the junction 30, is not critical. In fact, a height differential $h_4$–$h_3$ of only a few inches has been found to be more than adequate in balancing the hydraulic head loss due to water flow from $h_3$ to the return line opening 52 into the sump tank 12. Thus during normal operation there is no siphoning action or flow through the vacuum-break section 32 from $h_3$ to the top 42 of the sump tank 12. Furthermore, the down-section 50 to the top opening 42 of the sump tank 12 can be formed of oversized piping, relative to the size of the vertical section 38, such that the section 50 does not diminish the effective height of the vertical section 38 in preventing operating flow or siphoning through the vacuum break section 32 into the sump tank 12.

Drain-down of the solar collector 18 occurs in the following manner. When the temperature differential sensed by the controller 60 drops to about 1° C., the controller 60 cuts off power to the system pump 14. The internal volute chamber of the pump 14 has sufficient clearance so that water flows freely through it when the pump is deenergized. Upon deenergization of the pump 14, circulation through the heating system ceases, except for the fluid in the vertical initial draining section 34 and the vacuum-break section 32, because the system is closed. However, fluid in the vacuum-break section 32, the initial draining section 34, and the sump tank 12 seeks to reach a common level because of communication of the vacuum-break section 32 with air in the top of the sump tank 12. Thus, water from the vertical initial draining section 34 gravity drains into the sump tank 12 through the opening 52, thereby drawing whatever fluid existing in the vacuum-break section 32 towards the initial draining section 34. As water is drawn from the vacuum-break section 32, air from the top of the sump tank 12 fills the vacuum-break section 32 and reaches the junction 30 in the return line. At this time, the vacuum in the return line 22 is broken, as air from the top of the sump tank 12 enters the section 26 of the return line 22, thereby initiating drainage of the return line 22 and the solar collector 18. As drainage proceeds, the supply line 20 likewise commences drainage through the volute chamber of the pump 14 into the sump tank 12. It is noted that drainage of the supply line 20 produces a siphoning effect with respect to water remaining in the collector 18 and the return line 22, thereby hastening the overall system drain-down. It is therefore seen that once drainage has been initiated in the return line 22, drainage continues, by a combination of siphoning and admittance of additional air from the sump tank 12, until the water level in the closed solar heating system 10 returns to $h_5$, which is higher than $h_1$ because of temperature expansion of the heated fluid. All piping above the level $h_2$, the operating water level within the sump tank 12, is installed with a back slope of at least 1/16 of an inch per foot in order to assure drainage.

As mentioned above, the solar heating system 10 is a closed system. Therefore no new air is introduced into the system during drain-down, and the system is less susceptible to corrosion of the flow passages. Also, the flow plug 58 is fitted with an automobile tire type air valve concentrically positioned within a fluid fill opening so that the solar heating system 10 can be pressurized to avoid boiling and/or vaporization of the circulating water at the output of the solar collector 18. It is noted that if vaporization were to occur in the return line 22, a hydraulic imbalance would be created between the supply line 20 and the return line 22, which would disadvantageously increase the hydraulic load to the system pump 14, since the pump 14 must then overcome the forces of gravity in the supply line 20.

In installation, the sump tank 12 is placed in a non-freezing location with its bottom preferably being located about 3 and ½ feet below the bottom manifold 62 of the solar collector 18. The heat exchange tank 16 can be located near the collector, or remotely located well below the sump tank e.g. as on a basement floor. As stated above, the return line 22 is constructed of smaller diameter piping than the supply line 20 in order to assure that a low start-up flow carries all the air in the collector 18 and the return line 22 back to the sump tank 12. The solar heating system 10 shown in FIG. 1 designed for collector flows of from 2 to 5 gallons of water per minute, exhibits typical fill and drain times of from 15 to 30 seconds. The sump tank 12 may also be located well below the collector such as on a basement floor near the heat exchange tank 16, but a larger pump 14 may then be required to provide sufficient start-up lifting head.

In another embodiment of the invention, shown in FIG. 2, ¾ inch inner diameter piping is used in the supply line 20, and in the return line 22 from the output 28 of the collector 18 to a point 62 in the vicinity of the sump tank 12. The section in the return line 22 from the point 62 to the junction 30, the vacuum-break section 32, and the initial draining section 34, as shown in FIG. 2, uses ½ inch inner diameter piping. Immediately below the point 62, a restriction 64 is made by squeezing the ½ inch pipe to a semi-elliptical shape for a 4 inch length. A cross-section of the restriction 64 is shown in FIG. 3. The restriction 64 facilitates filling of the return line 22 during startup, and passage of air upward through the return line during drain-down. The semi-elliptical shape of the restriction 64 is used instead of smaller diameter piping, e.g. ¼ inch inner diameter piping, in order to avoid an air lock in the return line 22, which otherwise might be created because of the strength of the meniscus of the water, due to surface tension, forming at the end of a smaller diameter pipe. The embodiment shown in FIG. 2 also employs a second or "starting" pump 66 which is desirable when long pipe lines are needed between the sump tank 12 and the heat exchange tank 16. As shown in FIG. 2, this solar heating system is specifically designed for operation flow rates from 5–10 gallons per minute.

For larger systems such as are used in residential space heating, flow rates of 10 to 15 gallons per minute are required, and the embodiment shown in FIG. 4 is provided. This embodiment incorporates the same basic draindown features of the embodiments shown in FIGS. 1 and 2, and described above, essentially having an "initial draining section" of the collector return down flow pipe, which in FIG. 4 occurs between the levels $h_3$ and $h_2$. The key distinguishing feature of the embodiment shown in FIG. 4 is the provision of a flow diversion device for initially restricting flow in the return line during start-up in order to fill the return line with water and remove air from the return line to a sump tank. After a predetermined time delay, during which the return line is filled with water, the restriction is removed, and normal high flow rates proceed.

The larger system of FIG. 4 is seen to contain the bypass expansion and drain sump (BEDS) tank 68, system pump 72, a main hot water storage (MHWS) tank 70, the solar collector 18, the supply line 20, and the return line 22. Also shown are the in-line air separator 74, the two-way motor operated diverting valve 76, the cross-connecting pipe 78 of restrictive undersized diameter, and the anti-siphon loop 80.

While the operation of the system shown in FIG. 4 is basically similar to the operation of the system in FIGS. 1 and 2, it is noted that the system of FIG. 4 is specifically designed to operate at higher flow rates, and the various components are therefore generally oversized relative to the components of FIG. 1 and FIG. 2.

Also, the system of FIG. 4 is essentially a dual flow system, with high fluid flow during normal operation, and a low flow rate during start-up after drain-down.

Thus, a high flow path through the supply line 20 and return line 22 is formed of piping having an internal diameter of one inch. A low flow path is also provided, as hereinafter described, by diverting fluid flow from the main high flow path to a low flow path formed of piping having an internal diameter of ¼ inch during start-up.

Operation of the system shown in FIG. 4 is now described. Assuming that collector 18 is initially drained, actuation of the system pump 72 is again under the control of the electronic controller 60 which actuates the pump 72 when the temperature of the solar collector 18 exceeds the temperature of the MHWS tank 70 by a temperature of approximately 7°. The diverting valve 76 at start-up is initially open with the AB port open to the B port and closed to the A port. Therefore, the pump 72 draws water from the BEDS tank 68, pushes the water through the MHWS tank 70, the supply line 20, the solar collector 18, and into the return line 22. As seen in FIG. 4, the in-line air separator 74 is in series with the return line 22, with the separator having a main fluid flow line 82 leading to the valve port AB of the valve 76. Air initially in the supply line 20, the collector 18, and the return line 22 is returned to the top of the BEDS tank 68 by means of the air separator air line 84. Thus, during start-up air initially in the piping and the collectors is returned to the top of the BEDS tank 68 by means of the air separator air line 84, while fluid flow returns to the BEDS tank 68 through the pipe segment 86 between the B port of the valve 76 and the intermediate opening 88 in the BEDS tank 68. The pipe segments 84 and 86 are undersized, as discussed above, and thus form the critical portions of the low flow start-up path. As a result of the pipe segments 82 and 86 flow back pressure is developed during start-up, thus assuring effective air removal from and fluid filling of the working portions of the solar heating system.

After a predetermined time delay, as programmed into the controller 60, the valve 76 is actuated such that flow through the valve 76 commences from the input port AB to the output port A. From the A port, fluid flow continues through the pipe segment 90 and to a segment 91 of the supply line 20 between the pump 72 and a bottom outlet 92 of the BEDS tank 68, while the B port is closed.

It is therefore seen that after start-up, the BEDS tank 68 is effectively removed from the flow path of the system. As a result, water within the BEDS tank is not prone to whirlpooling as might otherwise occur as a result of the high operating flows encountered in the system of FIG. 4. It is noted that if whirlpooling were to occur within the BEDS tank the possibility could exist that air from the top of the BEDS tank 68 might communicate with the bottom outlet 92, thereby feeding air to the input of the pump 72. Obviously, air at the pump input is undesirable, and is advantageously prevented by bypassing the BEDS tank 68 in a high flow solar heating system, as shown in FIG. 4.

Drain-down of the system shown in FIG. 4 is achieved in virtually the same manner as was described above for the embodiment shown in FIG. 1 and FIG. 2. In FIG. 4, the pipe segment 84 serving as an air line from the top of the in line separator 74 to the top opening 94 of the BEDS tank 68 performs the function of the vacuum-break section 32 described above. The air line 84 includes an undersized (¼ inner diameter) vertical section 96 extending upwardly from the top of the air separator 74, a similarly sized horizontal section 100 from the vertical section 96 to a point above the BEDS tank 68, and a vertical section 98 extending downwardly from the horizontal section 100 to the top 94 of the BEDS tank 68. Once again, the short vertical down pipe 98 into the top opening 94 of the BEDS tank 68 can be formed of oversized (1 inch) piping and thus the downward length of this pipe does not subtract from the vertical height of the pipe section 96, which of necessity must present to the flow path of the return line 22 a greater hydraulic load than the hydraulic head loss between the air separator 74 and the system pump 72.

Drain-down of the system shown in FIG. 4 is also accomplished by means of an initial draining path provided between the levels $h_3$ and $h_2$ to $h_5$, where $h_2$ is the operating water level of the BEDS tank 68, $h_3$ corresponds to the level above ground (g) of the air separator and $h_5$ relates to the fill level of the hot expanded transport fluid within the BEDS tank 68 after drain-down. Initial draining occurs from the fluidoutput of the air separator 74, through the pipe segment 82, the valve 76, and depending on the position of valve 76, through either the pipe segment 86 or the pipe segments 90 and 93 to the bottom outlet 92 of the BEDS tank 68. When the temperature differential sensed by the controller 60 drops below a predetermined level, the controller 60 deenergizes the system pump 14. Drain-down is initiated in the "initial draining section" of the return piping and continues until the heated and expanded fluid returns to the level $h_5$ in the BEDS tank 68. Water in the initial draining section drains into the BEDS tank 68 under the force of gravity, and empties the vacuum-break section 84 of any fluid content. Air from the top of the BEDS tank 68 reaches the air port of the separator 74, the vacuum in the return line 22 is broken, and drain-down commences in the manner discussed above.

The cross-connector section 78 shown in FIG. 4 is incorporated between the supply line 20 and the return line 22 to hasten the draining process by admitting air into the supply line 20 before such occurrence would normally be produced, and is undersized to prevent signifigant bypassing of collector fluid flow from supply pipe 20 to return pipe 22.

It is further seen in FIG. 4 that the MHWS tank 70 is directly in the flow path of the supply line 20. The U-portion of the anti-siphon loop is located at a level $h_6$ well below the initial fill line $h_1$ within the BEDS tank 68. Since the supply line 20 drains-down to the level $h_1$, the anti-siphon loop 80 prevents transfer of water from the MHWS tank 70 to the BEDS tank 68. As a result, the BEDS tank 68 is of considerably smaller dimensions than the MHWS tank 70, which significantly facilitates installation of the solar heating system of the invention.

Figure 5:
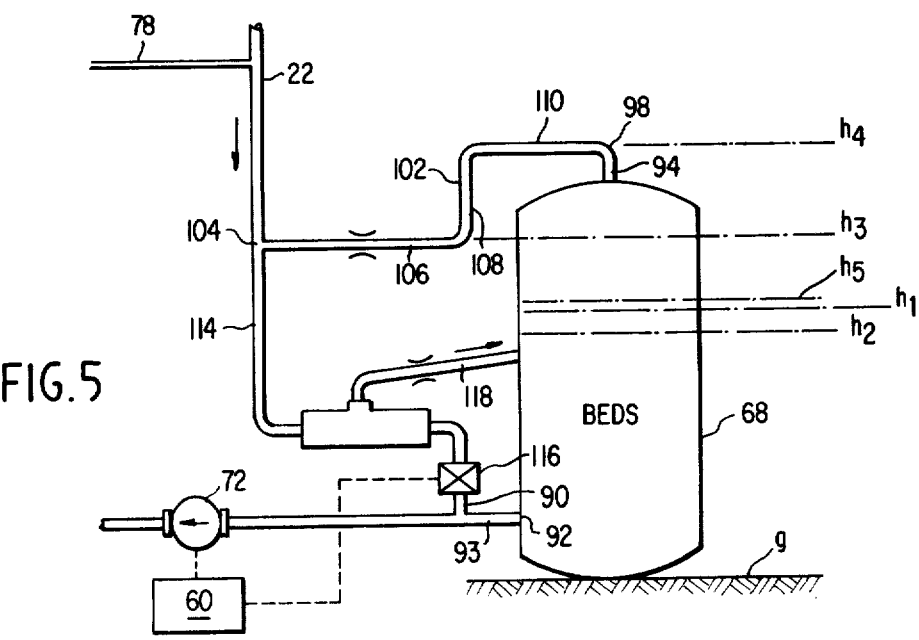
FIG. 5 is a schematic system diagram of another embodiment of the solar heating system shown in FIG. 4, with an improved arrangement of sump-drain-down components.

An improved arrangement of some components is shown in the preferred embodiment of FIG. 5. In FIG. 5 there is provided an undersized (¼ inch inner diameter) vacuum-break section 102 from a junction 104 in the over sized return line 22 to the top of the BEDS tank 94. The vacuum-break section 102 includes undersized horizontal pipe sections 106 and 110, undersized vertical section 108, and the oversized vertical down pipe section 98 into the top opening 94 of the BEDS tank 68. Once again the relatively oversized down pipe 98 is of larger diameter to keep this pipe from filling, and thus this pipe does not subtract its height from the effective height of the vertical section 108, which prevents fluid flow through the vacuum-break section 102 except during initial filling of return line 22 during start-up.

The embodiment of FIG. 5 is likewise a dual flow system with flow diversion from a high flow path to a low flow path during a start-up time interval. The system of FIG. 5 includes an initial draining section 114 from the junction 104 to the bottom input of 92 of the BEDS tank 68. However, within the flow path of the initial draining section 114 is provided the air separator 74 and the motorized straight-through valve 116. During start-up, the valve 116 which is normally spring-loaded to an open position, is forced to a closed position for a time delay period programmed into the controller 60. At this time, system flow is diverted to the undersized (¼ inch) air separation line 118 of the air separator 74 and the undersized vacuum-break section 102 into the BEDS tank 68. The restriction to flow provided by the parallel combination of pipes 102 and 118 is such that the return line 22 will fill up with the limited flow available from the pump at the top of the collectors on start-up, while the fluid brings the air down with it. After expiration of a time delay period programmed into the controller 60, the motorized valve 116 is deenergized, and the valve 116 automatically opens to commence high flow operation through the oversized (1 inch) supply line 20, and the oversized return line 22. A time delay of between three and five minutes has been found adequate to expell all the air from the collectors, the supply and return lines into the sump-tank on start-up.

Several notable advantages inhere to the embodiment of FIG. 5. This embodiment generally offers quiet operation by allowing evolved air in the return line 22 to flow up the restrictive pipe 118 into the BEDS tank 68 beneath the water line within the BEDS tank 68. Also, from the standpoint of ease in installation, it is easier to mount the air separator as in FIG. 5 near the bottom of the BEDS tank 68, than near the top of this tank as in FIG. 4. Also, as seen in FIG. 5, the vacuum-break line 102 has more direct access to the return line 22, which promotes faster drain-down. Furthermore, the combination of flows through the valve 116 and the restrictive pipe 118 creates less hydraulic head loss which can be more easily offset by the vertical leg 108 of the vacuum-break section 102 to prevent siphoning through the vacuum-break section 102 into the top 94 of the BEDS tank 68. In addition, the dynamic pressure drop across the valve 116 when the system pump 14 is operating produces a backflow from the air separator 74 through the restrictive pipe 118 into the BEDS tank 68, thereby assisting in the removal of air in the pipes ahead of the pump 72. Finally, upon deenergization of the pump 72, fluid flow through the initial drainage section 114 already has significant downward flow momentum, and any flow through the restrictive pipe 118 does not therefore reverse direction during drain-down.

It is particularly noted that neither of the embodiments of FIG. 4 or FIG. 5 depends upon valve position or actuation to promote effective collector drain-down. In the event of failure of a flow diversion valve in either solar heating system, an initial draining path of the BEDS tank 68 is provided through the restrictive pipe segments 86 or 118 to permit drain-down, allbeit of a slower nature. It is therefore seen that the embodiments of FIG. 4 and FIG. 5 always present a drain-down path to the collectors, and thereby provide failsafe protection against collector freeze-up.

Obviously, numerous modifications and variations of the present invention are possible in light of the above teachings. One such modification is the substitution of other drainable devices, such as a drainable heat exchanger in place of the solar collectors herein shown, in order to utilize the filling and drain-down features of the present invention with such devices. Furthermore, the filling and drain-down concepts of the invention are generally applicable to any fluid circulation system wherein fluid circulates between one container and a second elevated container. It is therefore to be understood that within the scope of the appended claims, the invention may be practiced otherwise than as specifically described herein.

What is claimed as new and desired to be secured by Letters Patent of the United States is:

1. A closed solar heating system wherein a heat transport fluid is forced to circulate between a heat exchange tank and a solar collector having an input port, an output port and backsloped piping, said transport fluid absorbing heat produced by solar energy impinging on said solar collector, releasing absorbed heat in said heat exchange tank, and recirculating through said solar collector, comprising:

a sump tank serving as a reservoir for said transport fluid and located in a non-freezing area, said sump tank having a top opening, a bottom opening, and an intermediate opening between said top and bottom openings, said sump tank initially filled with said transport fluid to an initial fill level between said top and said intermediate openings, said heat transport fluid rising to an expanded fluid fill level, higher than said initial fill level, after drain-down of said solar collector;

a system pump having an input port in fluid connection with said bottom opening of said sump tank, said system pump forcing the circulation of said transport fluid;

system controller means coupled to said system pump for controlling the operation of said pump in accordance with predetermined temperature differentials existing within said solar heating system;

collector supply line means connected to said output port of said system pump and coupled through said heat exchange tank to said input port of said solar collector, for providing a supply flow path from said pump to said heat exchange tank and said solar collector, said supply line means formed of piping having a first internal diameter;

collector return line means for coupling said output port of said collector to said sump tank, said collector return line means comprising an initial return section coupled to said output port of said collector, and formed of piping with at least one portion of said piping having a second internal diameter smaller than said first internal diameter, a vertical initial draining section formed of piping having said second internal diameter, said initial draining section extending generally downwardly and coupling said initial return section to said intermediate opening of said sump tank, and a vacuum-break section coupling said initial return section and said initial draining section at a first height above said expanded fluid fill level to said top opening of said sump tank, said vacuum-break section including a first portion extending upwardly to a second height above said first height to prevent fluid flow through said vacuum-break section during operation of said pump, and a second portion connected to said first portion and extending generally downwardly and coupling said top opening of said sump tank, said initial draining section and said vacuum break section being located in the vicinity of said sump tank in said non-freezing area;

whereby deenergization of said pump by said controller means produces a cessation of circulation of said transport fluid, causing fluid contained in said initial draining section to drain under the force of gravity into said sump tank, thereby drawing air from said top of said sump tank through said vacuum-break section into said initial return line, breaking the vacuum in said return line means, and commencing drain-down of said solar collector.

2. A closed solar heating system according to claim 1, wherein:

said first portion of said vacuum break section of said return line means comprises piping having said second internal diameter; and said second portion of said vacuum break section comprises piping having said first internal diameter.

3. A closed solar heating system according to claim 1, wherein said sump tank further comprises:

pressurization means for pressurizing said solar heating system at a pressure above atmospheric pressure.

4. A closed solar heating system according to claim 1, wherein at least a portion of said initial return section comprises:

piping having a semi-elliptical cross section.

5. A solar heating system according to claim 1, further comprising:

a second system pump in series with said first system pump and located in the vicinity of said heating exchange tank, said second system pump used when said heat exchange tank is located remotely with respect to said sump tank and said collector.

6. A solar heating system according to claim 1, wherein said supply line means further comprises, a plurality of heat exchange fins attached to said portion of said piping of said supply line means which passes through said heat exchange tank.

7. A solar heating system according to claim 1, wherein said heat transport fluid comprises water.

* * * * *